US011640570B2

(12) United States Patent
Sarkar

(10) Patent No.: US 11,640,570 B2
(45) Date of Patent: May 2, 2023

(54) METHODS AND SYSTEMS OF RISK IDENTIFICATION, QUANTIFICATION, BENCHMARKING AND MITIGATION ENGINE DELIVERY

(71) Applicant: Ajay Sarkar, Encinitas, CA (US)

(72) Inventor: Ajay Sarkar, Encinitas, CA (US)

( * ) Notice: Subject to any disclaimer, the term of this patent is extended or adjusted under 35 U.S.C. 154(b) by 180 days.

(21) Appl. No.: 17/139,939

(22) Filed: Dec. 31, 2020

(65) Prior Publication Data

US 2022/0207442 A1 Jun. 30, 2022

(51) Int. Cl.
*G06Q 10/00* (2012.01)
*G06Q 10/0635* (2023.01)
*G06N 3/08* (2023.01)
*G06Q 50/26* (2012.01)

(52) U.S. Cl.
CPC ........... *G06Q 10/0635* (2013.01); *G06N 3/08* (2013.01); *G06Q 50/265* (2013.01)

(58) Field of Classification Search
None
See application file for complete search history.

(56) References Cited

U.S. PATENT DOCUMENTS

| | | | | |
|---|---|---|---|---|
| 9,671,776 B1* | 6/2017 | Beard | ................ | G06Q 10/0635 |
| 10,706,474 B2* | 7/2020 | Rieth | .................... | G06Q 40/08 |
| 2015/0088597 A1* | 3/2015 | Doherty | ............. | G06Q 10/0635 |
| | | | | 705/7.28 |
| 2015/0213225 A1* | 7/2015 | Amarasingham | ...... | G16H 50/30 |
| | | | | 705/2 |
| 2017/0230402 A1* | 8/2017 | Greenspan | ............ | H04W 12/08 |
| 2019/0207968 A1* | 7/2019 | Heckman | ............ | H04L 63/1425 |
| 2020/0274894 A1* | 8/2020 | Argoeti | .................... | G06F 7/556 |
| 2020/0286016 A1* | 9/2020 | Singh | ..................... | G06N 20/00 |
| 2020/0410001 A1* | 12/2020 | Sarkissian | ............... | H04L 67/55 |

OTHER PUBLICATIONS

Cheng, Long, Fang Liu, and Danfeng Daphne Yao. "Enterprise data breach: causes, challenges, prevention, and future directions." (2017). (Year: 2017).*

(Continued)

*Primary Examiner* — Gurkanwaljit Singh

(57) ABSTRACT

A computerized process useful for automating Risk Identification, Quantification, Benchmarking and Mitigation in an enterprise computer system, includes the step of integrating an enterprise security, privacy and compliance system in an enterprise computer system. The enterprise security, privacy and compliance system monitors a set of risk sources. The method includes the step of implementing an identification and a weighted scoring of a set of risks associated with each risk source. The method includes the step of, with a specified machine learning technique, matching a set of similar risk inputs with an associated weight. The set of similar risk inputs are similar to the risk sources in the RPPBM practice. The method includes the step of monitoring the relevant enterprise systems for changes in risk levels of each risk source. The method includes the step of generating a risk-score number for each risk source. The risk-score number is used to avoid a subjective assessment of the risk source.

12 Claims, 15 Drawing Sheets

(56) References Cited

OTHER PUBLICATIONS

Restuccia, Francesco, Salvatore D'Oro, and Tommaso Melodia. "Securing the internet of things in the age of machine learning and software-defined networking." IEEE Internet of Things Journal 5.6 (2018): 4829-4842. (Year: 2018).*
Abrams, Carl, et al. "Optimized enterprise risk management." IBM Systems Journal 46.2 (2007): 219-234. (Year: 2007).*
Webb, Jeb, et al. "A situation awareness model for information security risk management." Computers & security 44 (2014): 1-15. (Year: 2014).*

* cited by examiner

METHODS AND SYSTEMS OF RISK IDENTIFICATION, QUANTIFICATION, BENCHMARKING AND MITIGATION ENGINE DELIVERY

BACKGROUND

Executives and companies across different industries are faced with the daunting task of identifying, understanding and managing ever-evolving risk and compliance threats and challenges in their organizations. Risk identification and management activities are often conducted by way of manual assessments and audits. Such manual assessments and audits only provide a brief snapshot of risk at a moment in time and do not keep pace with ongoing enterprise threats and challenges. Current risk management programs are often decentralized, static and reactive and their design has focused on governance and process rather than real-time risk identification and quantification of risk exposure. This can hamper Boards' abilities to make forward-looking risk mitigation decisions and investments.

In between such manual assessments and audits, it is difficult to make an accurate assessment of risk given the volume and disparate nature of the data that is needed and available at any point in time to conduct such a review. Data sources can be limited, incomplete and opaque.

In addition, organizational change that occurs in between manual assessments and audits can impact risk profile. Examples of change include new projects and programs, employee changes, new systems, vendors, users, administrators and new compliance laws, regulations and standards.

The risks to an enterprise can include various factors, including, inter alia: security and data privacy breaches (e.g. which threaten C-level jobs, potentially cost organizations millions of dollars, and can have personal legal implications for board members); data maintenance and storage issues; broken connectivity between security strategy and business initiatives; fragmented solutions covering security, privacy and compliance; regulatory enforcement activity; moving applications to a cloud-computing platform; and an inability to quantify the associated risk. Accordingly, a solution is needed that is a real-time, on-demand quantification tool that provides an enterprise-wide, centralized view of an organization's current risk profile and risk exposure.

SUMMARY OF THE INVENTION

A computerized process useful for automating Risk Identification, Quantification, Benchmarking and Mitigation in an enterprise computer system, includes the step of integrating an enterprise security, privacy and compliance tool into the system. Real-time, the enterprise security, privacy and compliance system monitors a set of risk events and risk sources. The method includes the step of—calculating and assigning a set of weighted risks scores relevant to each corresponding risk source. The method includes machine learning step that matches, compares and analyses past risk data points to current, similar risk situations. The method includes the step of monitoring the relevant enterprise systems for changes in risk levels of each risk source. The method includes the step of generating a risk score number for each risk source. The risk-score number is used to avoid a subjective assessment of the risk source. With a natural language generation (NLG) functionality, the method includes the step of generating a report comprising a snapshot of the data of the risk-score number for each risk source.

Figure 1:
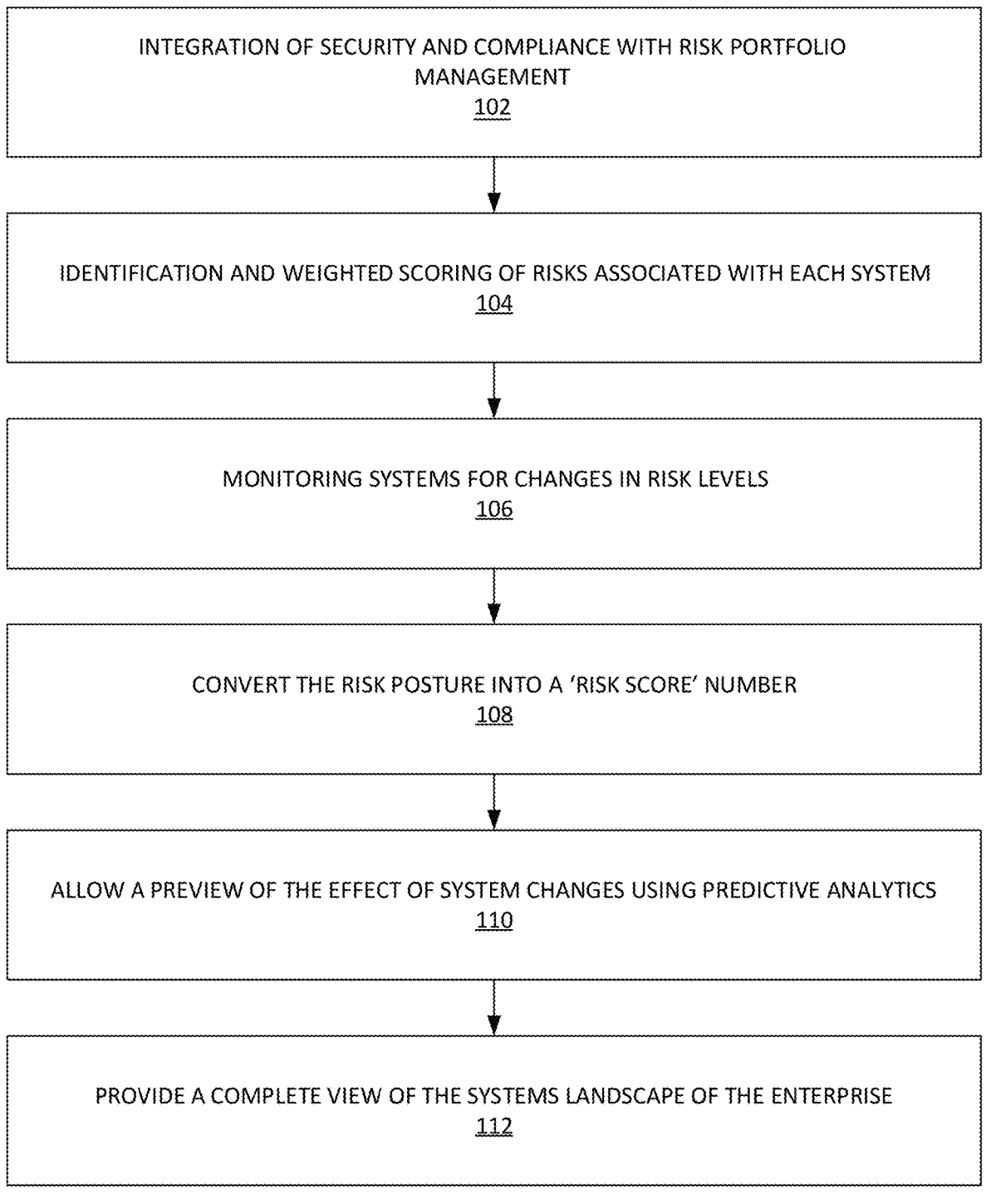
FIG. 1 illustrates an example process for implementing Risk Identification, Quantification, Benchmarking and Mitigation engine delivery, according to some embodiments.

The Figures described above are a representative set and are not exhaustive with respect to embodying the invention.

DESCRIPTION

Disclosed are a system, method, and article of Risk Identification, Quantification, Benchmarking and Mitigation engine delivery. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment;' 'an embodiment,' 'one example,' or similar language means that a particular feature, structure, or characteristic described in connection with the embodiment is included in at least one embodiment of the present invention. Thus, appearances of the phrases 'in one embodiment;' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) is a set of subroutine definitions, communication protocols, and/or tools for building software. An API can be a set of clearly defined methods of communication among various components.

Artificial Intelligence (AI) is the simulation of intelligent behavior in computers, or the ability of machines to mimic intelligent human behavior.

Business Initiative(s) can include a specific set of business priorities and strategic goals that have been determined by the organization. Business Initiatives can include ways the organization/enterprise indicates what its vision is, how it will improve, and what it believes it needs to do in order to be successful.

Business Intelligence (BI) is the analysis of business information in a way to provide historical, current, and future predictive views of business performance. BI is descriptive analytics.

Cloud computing can involve deploying groups of remote servers and/or software networks that allow centralized data storage and online access to computer services or resources. These groups of remote servers and/or software networks can be a collection of remote computing services.

Corporate Intelligence (CI) includes the analysis of Business Intelligence data by AI in order to optimize business performance.

Risk performance management (RPM) can include business performance management.

CXO is an abbreviation for a top-level officer within a company, where the "X" could stand for, inter alia, "Executive," "Operations," "Marketing," "Privacy," "Security" or "Risk".

Data Model (DM) can be a model that organizes data elements and determines the structure of data.

Enterprise risk management (ERM) in business includes the methods and processes used by organizations to identify, assess, manage and mitigate risks and identify opportunities to support the achievement of business objectives.

Exponentiation is a mathematical operation, written as $b^n$, involving two numbers, the base b and the exponent or power n, and pronounced as "b raised to the power of n". When n is a positive integer, exponentiation corresponds to repeated multiplication of the base: that is, $b^n$ is the product of multiplying n bases.

Machine Learning can be the application of AI in a way that allows the system to learn for itself through repeated iterations. It can involve the use of algorithms to parse data and learn from it. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Natural-language generation (NLG) can be a software process that transforms structured data into natural language. NLG can be used to produce long form content for organizations to automate custom reports. NLG can produce custom content for a web or mobile application. NLG can be used to generate short blurbs of text in interactive conversations (e.g. with a chatbot-type system, etc.) which can be read out by a text-to-speech system.

Predictive Analytics includes the finding of patterns from data using mathematical models that predict future outcomes. Predictive Analytics encompasses a variety of statistical techniques from data mining, predictive modeling, and machine learning, that analyze current and historical facts to make predictions about future or otherwise unknown events. In business, predictive models exploit patterns found in historical and transactional data to identify risks and opportunities. Models can capture relationships among many factors to allow assessment of risk or potential risk associated with a particular set of conditions, guiding decision-making for candidate transactions.

Risk Program, and Portfolio Management (RPPBM). Risk program management is the practice of initiating, planning, executing, controlling, and closing the work of a team to achieve specific risk goals and meet specific success criteria at the specified time. Risk program management is the process of managing several related risks, often with the intention of improving an organization's overall risk performance. RPPBM is the selection, prioritization and control of an organization's risks and programs in line with its strategic objectives and capacity to deliver.

Recurrent neural network (RNN) is a class of artificial neural networks where connections between nodes form a directed graph along a temporal sequence. In one example, derived from feedforward neural networks, RNNs can use their internal state (memory) to process variable length sequences of inputs.

Example Methods

Disclosed are various embodiments of a Risk Identification, Quantification, Benchmarking and Mitigation engine. The Risk Identification, Quantification, Benchmarking and Mitigation engine provides various ERM functionalities. The Risk Identification, Quantification, Benchmarking and Mitigation engine can leverage various advanced algorithmic technologies that include AI, Machine Learning and block chain. The Risk Identification, Quantification, Benchmarking and Mitigation engine can provide proactive and continuous risk monitoring and management of all key risks collectively across an organization/entity. The Risk Identification, Quantification, Benchmarking and Mitigation engine can be used to manage continuous risk exposure, as well as assisting with the reduction of residual risk.

Accordingly, examples of a Risk Identification, Quantification, Benchmarking and Mitigation engine are provided. A Risk Identification, Quantification, Benchmarking and Mitigation engine can obtain data and analyze multiple complex risk problems. The Risk Identification, Quantification, Benchmarking and Mitigation engine can analyze, inter alia: global organization(s) data (e.g. multiple jurisdictions data, local business environment data, geo political data, culturally diverse data, etc.); multiple stakeholders data (e.g. business line data, functions data, levels of experience data, third party data, contractor data, etc.); multiple risk category data (e.g. operational data, regulatory data, compliance data, privacy data, cybersecurity data, financial data, etc.); complex IT structure data (e.g. system data, application data, classification data, firewall data, vendor data, license data, etc.); etc. The Risk Identification, Quantification, Benchmarking and Mitigation engine can utilize data that is aggregated and analyzed to create, real-time, collective and predictive custom reports for different CXOs. The Risk Identification, Quantification, Benchmarking and Mitigation engine can generate risk board reports. The risk board reports include, inter alia: a custom, risk mitigation decision-making roadmap. In this regard, the Risk Identification, Quantification, Benchmarking and Mitigation engine can function as an ERM program, performing real-time, on demand enterprise-wide risk assessments. For example, the Risk Identification, Quantification, Benchmarking and Mitigation engine can be integrated across, inter alia: technical Infrastructure (e.g. cloud-computing providers); application systems (e.g. enterprise applications focused on customer service and marketing, analytics, and application development); company processes (e.g. audits, assessments, etc.); business performance tools (e.g. management, etc.), etc. Examples of various Risk Identification, Quantification, Benchmarking and Mitigation Engine methods, use cases and systems are now discussed.

FIG. 1 illustrates an example process 100 for implementing Risk Identification, Quantification, Benchmarking and Mitigation engine delivery, according to some embodiments. Process 100 can enable an understanding of an enterprise's risk profile by providing a cross-organization risk assessment of current programs, risks, and resources. Process 100 can be used for risk mitigation. Process 100 can enable an enterprise to utilize AI and machine learning to understand their big data in real-time, thereby supporting the organization's business operations and objectives. Process 100 automation can be used to provide visibility into an enterprise's vertical businesses in real time (assuming for example, network and processing latencies). Additionally, enterprise stakeholders at all levels of an organization can use process 100 to identify important risk information specific to their individual roles and responsibilities in order to understand and optimize their risk profile. As noted, process 100 can utilize various data science algorithms and analytics, combined with AI and Machine Learning.

More specifically, in step 102, process 100 can implement the integration of security, privacy and compliance with a RPPBM practice. In step 104, process 100 can calculate weighted scoring of risks associated with each enterprise system. It is noted that if manual inputs are not provided, then the scoring can be automatically completed using various specified machine learning techniques. These machine learning techniques can match similar risk inputs with an associated weight.

In step 106, process 100 can monitor the relevant enterprise systems for changes in risk levels. In step 106, process 100 can convert the risk level into a risk-score number. The objective risk-score number can help avoid any subjective assessment or understanding of the risk.

In step 110, process 100 can allow a preview of the effect of system changes using predictive analytics. In step 112, process 100 can provide a complete risk portfolio management view of the organization's systems across the enterprise.

Process 100 can provide an aggregated view of changes to security, privacy and compliance risk. Process 100 can provide a consolidated view of risk associated with different assets and processes in one place. Process 100 can provide risk scoring and quantification. Process 100 can provide risk prediction. Process 100 can provide a CXO with a complete view into of resource allocation and allow visibility into the various risk statuses and how all resources are aligned in real time.

Example Systems

Figure 2:
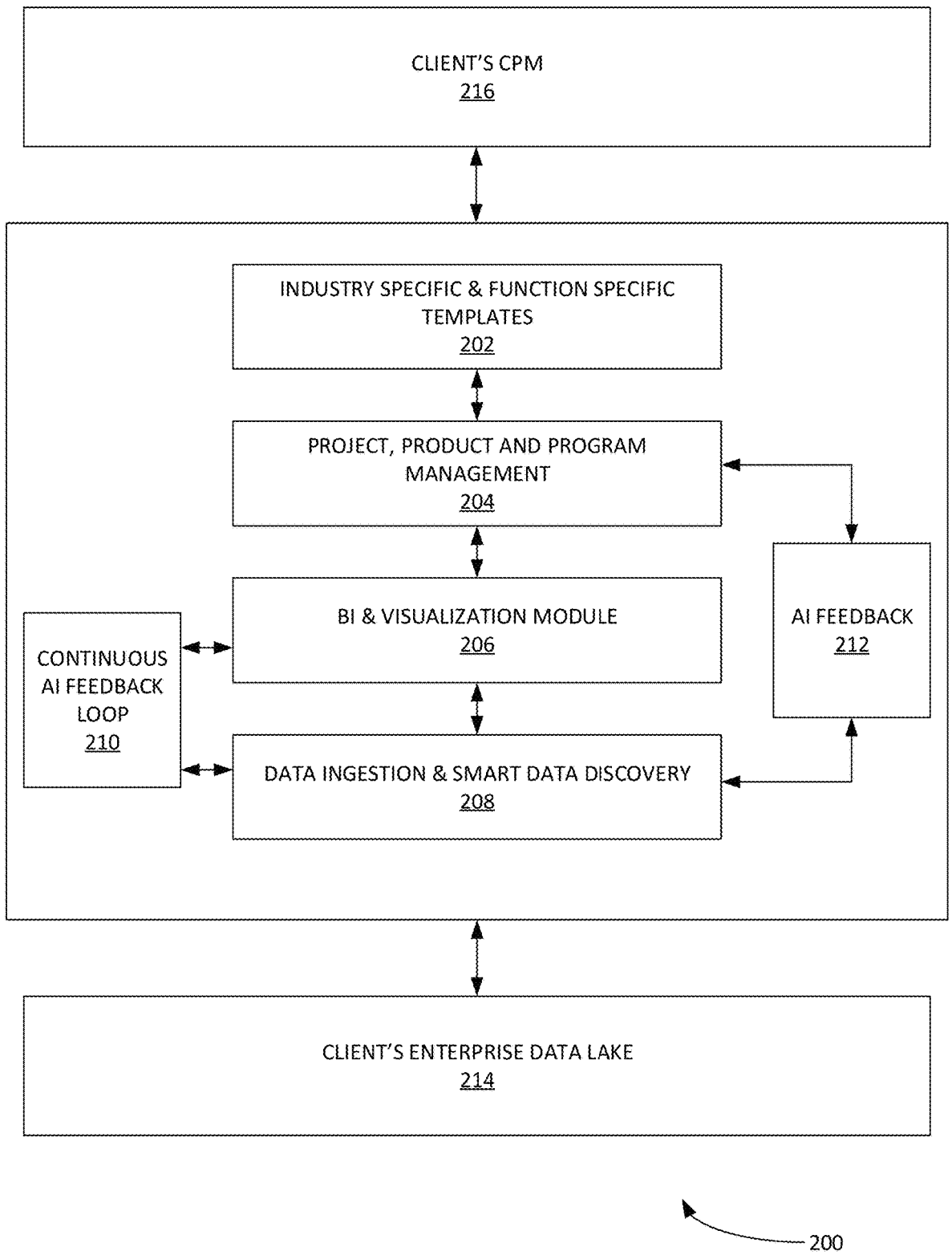
FIG. 2 illustrates an example Risk Identification, Quantification, Benchmarking and Mitigation Engine Delivery platform, according to some embodiments.

FIG. 2 illustrates an example Risk Identification, Quantification, Benchmarking and Mitigation Engine Delivery platform 200, according to some embodiments. Risk Identification, Quantification, Benchmarking and Mitigation Engine Delivery platform 200 can include industry specific and function specific templates. Risk Identification, Quantification, Benchmarking and Mitigation Engine Delivery platform 200 unique RPPBM technology, combined with powerful proprietary AI/ML and Blockchain algorithm, enables Enterprises to quantify Risks, and compare that with Industry Risk Benchmarking, developed. Risk Identification, Quantification, Benchmarking and Mitigation Engine Delivery platform 200 helps establishing and producing industry Risk benchmarking by combination of—proprietary algorithm, client data, and outside data sources. Risk Identification, Quantification, Benchmarking and Mitigation Engine Delivery platform 200 algorithm normalizes data across various industries, different revenue size companies, and clients with—different revenues, different risks appetite, and different systems. The industry specific and risk specific templates 202 is a set of industry specific templates that have been created to define, identify and manage the risk profiles of different industries. The list of target industries and associated compliance statutes can include, inter alia: financial services, pharmaceuticals, retail, insurance and life sciences.

Furthermore, specified templates can include compliance templates. Compliance templates are created to calculate a risk score of the effectiveness of the controls established in a specified organization. The established controls are checked against the results of assessments performed by clients. Based on the client's inputs, the AI engine calculates the risk score by comparing the prior control effectiveness (impact and probability) to current control effectiveness. It is noted that the risk score of any control can be the decision indicator based on the risk severity. Risk severity can be provided at various levels. For example, risk severity levels can be defined as, inter alia: critical, high, medium, low or very low.

Risk Identification, Quantification, Benchmarking and Mitigation Engine Delivery platform 200 can include risk, product and program management tool 204. Risk, product and program management tool 204 can enable various user functionalities. Risk product and program management tool 204 can define a set of programs, risks, and products that are in-flight in the enterprise. Risk, product and program management tool 204 can define the key stakeholders, risks, mitigation strategies against each of the projects, programs, and products. Risk, product and program management tool 204 can identify the high-level resources (e.g. personnel, systems, etc.) associated with the product, project or program. Risk, product and program management client tool 204 can provide the ability to define the changes in the enterprise system and therefore associate them to potential changes in risk and compliance posture.

Risk Identification, Quantification, Benchmarking and Mitigation Engine Delivery platform 200 can include BI and visualization module 206. BI and visualization module 206 can provide a dashboard and/or other interactive modules/GUIs. BI and visualization module 206 can present the user with an easy to navigate risk management profile. The risk management profile can include the following examples among others. BI and visualization module 206 can present a bird's eye view of the risks, based on the role of the user. BI and visualization module 206 can present the ability to drill into the factors contributing to the risk profile. BI and visualization module 206 can provide the ability to configure and visualize the risk as a risk score number using proprietary calculations. BI and visualization module 206 can provide the ability to adjust the weights for the various risks, with a view to perform what-if analysis. The BI and visualization module 206 can present a rich collection of data visualization elements for representing the risk state.

Risk Identification, Quantification, Benchmarking and Mitigation Engine Delivery platform 200 can include data ingestion and smart data discovery engine 208. Data ingestion and smart data discovery engine 208 engine can facilitate the connection with external data sources (e.g. Salesforce.com, AWS, etc.) using various APIs interface(s) and ingest the data into the tool. Data ingestion and smart data discovery engine 208 engine can provide a definition of the key data elements in the data source that are relevant to risk calculation, that automatically matches the elements with expected elements in the system using AI. Data ingestion and smart data discovery engine 208 can provide the definition of the frequency with which data can be ingested.

It is noted that a continuous AI feedback loop 210 can be implemented between BI and visualization module 206 and data ingestion and smart data discovery engine 208. Additionally, an AI feedback 212 can be implemented between Risk, product and program management tool 204 and data ingestion and smart data discovery engine 208. Risk Identification, Quantification, Benchmarking and Mitigation Engine Delivery platform 200 can include a client's enterprise data applications and systems 214. Client's enterprise data applications and systems 214 can include CRM data, RDBMS data, project management data, service data, cloud-platform based data stores, etc.

Risk Identification, Quantification, Benchmarking and Mitigation Engine Delivery platform 200 can provide the ability to track the effectiveness of the controls. Risk Identification, Quantification, Benchmarking and Mitigation Engine Delivery platform 200 can provide the ability to capture status of control effectiveness at the central dashboard to enable the prioritization of decision actions enabled by AI scoring engine (e.g. AI/ML engine 908, etc.). Risk Identification, Quantification, Benchmarking and Mitigation Engine Delivery platform 200 can provide the ability to track the appropriate stakeholders based on the controls' effectiveness for actionable accountability.

Risk Identification, Quantification, Benchmarking and Mitigation Engine Delivery platform 200 can define a system administrator. Quantification can include risk benchmarking. The system administrator can have complete root access to the application. In addition, a super administrator can have complete access to an application with the exception of deletion permissions. In this version, the system administrator can define and manage all the risk models, users, configuration settings, automation etc.

Figure 3:
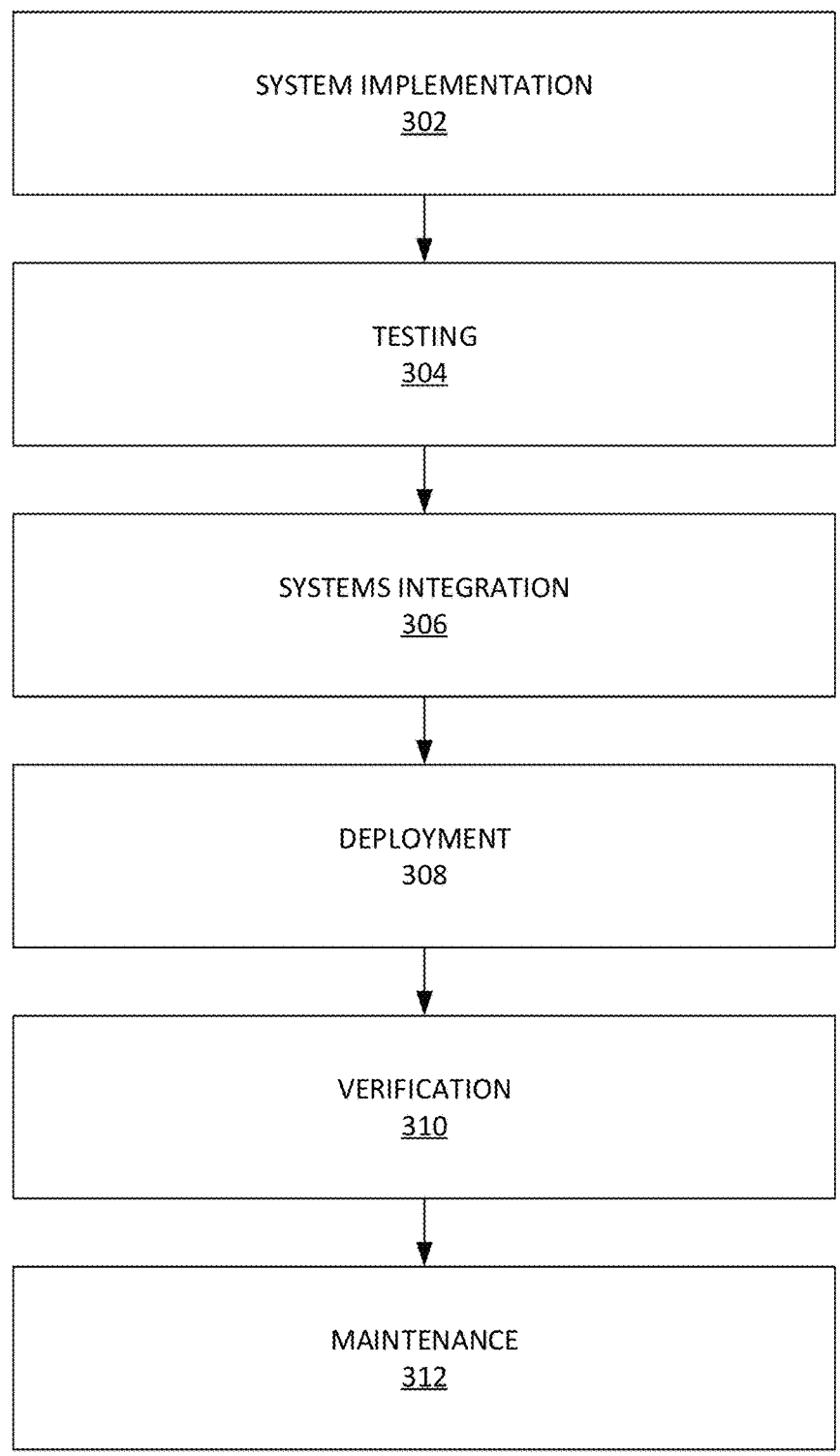
FIG. 3 illustrates an example process for implementing Risk Identification, Quantification, Benchmarking and Mitigation Engine Delivery platform, according to some embodiments.

FIG. 3 illustrates an example process 300 for implementing Risk Identification, Quantification, Benchmarking and Mitigation Engine Delivery platform 200, according to some embodiments. In step 302, process 300 can perform System Implementation. More specifically, process 300 can, after implementing the system, define a system administrator. The system administrator can have complete root access to the application. The system administrator may not be used for day-to-day operations in some examples. In one example, the process 300 can define a system administrator to complete access to the entire application, except deletion. In this way, system administrator can define and manage all the Risk Models, Users, Configuration Settings, Automation etc. Additional documentation can be provided as part of implementing the system.

In step 304, process 300 can perform testing operations. The Risk Identification, Quantification, Benchmarking and Mitigation Engine Delivery platform 200 can be tested in the non-production environment in the organization (e.g. staging environment) to ensure that the modules function as expected and that they do not create any adverse effect on the enterprise systems. Once verified, the system can be moved to the production environment.

In step 306, process 300 can implement client systems integration. The Risk Identification, Quantification, Benchmarking and Mitigation Engine Delivery platform 200 includes a standard set of APIs (e.g. connectors) to various external systems (e.g. AWS, Salesforce, Azure, Microsoft CRM). This set of APIs includes the ability to ingest the data from the external systems. The set of APIs are custom built and form a unique selling point of this system. Some organizations/entities have proprietary systems for which connectors are to be built. Once the connectors are built and deployed, the data from these systems can be fed into the internal engine and be part of the risk identification, monitoring and scoring process.

In step 308, process 300 can perform deployment operations. Deployment of Risk Identification, Quantification, Benchmarking and Mitigation Engine Delivery platform 200 enables the organization/enterprise and the stakeholders to identify and score the risk including the mitigation and management of the risk. The deployment process includes, inter alia, the following tasks. Process 300 can identify the environment in which the Risk Identification, Quantification, Benchmarking and Mitigation Engine Delivery platform 200 can be deployed. This can be a local environment within the De-Militarized Zone (DMZ) inside the firewall and/or any external cloud environment like AWS or Azure. Process 300 can scope out the system related resources (e.g. web/application/database servers including the configurations settings). Process 300 can define the stakeholders (e.g. C-level executives, administrators, users etc.) with a specific focus on security and privacy needs and the roles to manage the application in the organization.

In step 310, process 300 can perform verification operations. Verification can be a part of validating the Risk Identification, Quantification, Benchmarking and Mitigation Engine Delivery platform 200 in the organization as it is deployed and implemented. In the verification process, the stakeholders orient themselves towards scoring the risks (as opposed to providing subjective conclusions). This becomes a step in the overall success and adaptability of the application as inclusive as possible on a day-to-day basis.

In step 312, process 300 can perform maintenance operations. The technical maintenance of the system can include the step of monitoring the external connectors to ensure that the connectors are operating effectively. The step can also add new external systems according to the needs of the organization/enterprise. This can be completed using internal technical staff and staff assigned to the Risk Identification, Quantification, Benchmarking and Mitigation Engine Delivery platform 200, depending upon complexity and expertise level involved.

Figure 4:
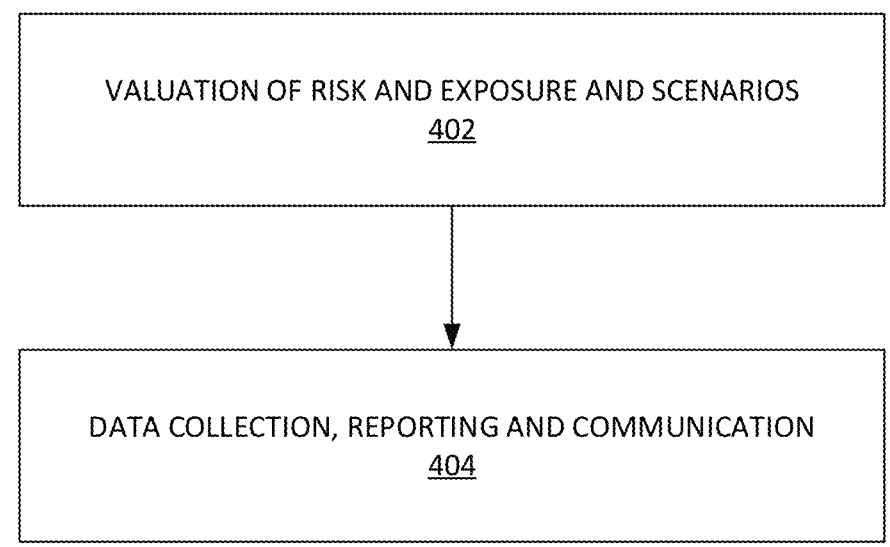
FIG. 4 illustrates an example risk assessment process, according to some embodiments.
Figure 5:
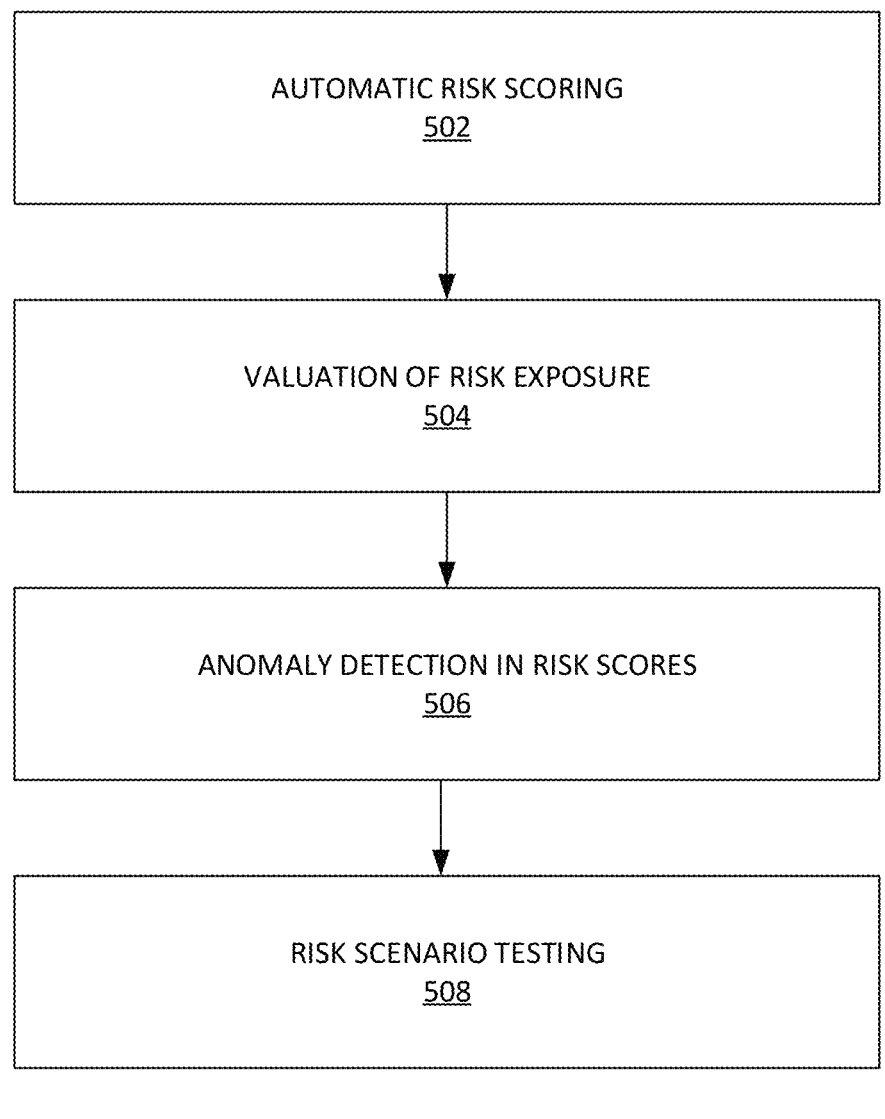
FIG. 5 illustrates an example automatic risk scoring process 500, according to some embodiments.

FIG. 4 illustrates an example risk assessment process 400, according to some embodiments. Process 400 can be used for accurate scoring of risk and determining financial exposure and remediation costs to an enterprise. Process 400 can combine multiple risk scores to provide an aggregated view across the enterprise.

In step 402, process 400 can implement accurate calculation of risk exposure and scenarios. In one example, process 400 can use process 500 to implement accurate calculation of risk exposure and scenarios.

Figure 6:
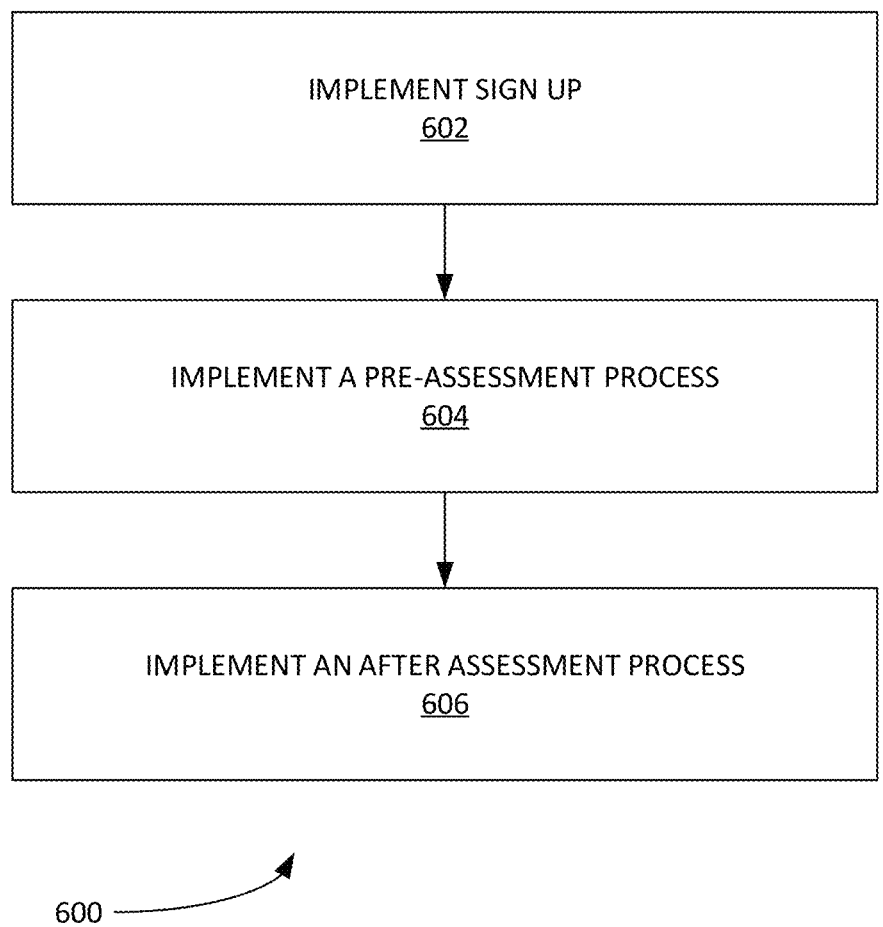
FIG. 6 illustrates an example automatic risk scoring process, according to some embodiments.

In step 502, process 400 can use process 600 to implement step 502. FIG. 6 illustrates an example automatic risk scoring process 600, according to some embodiments. Process 600 can calculate risk scores. The risk scores can determine the severity of the risk levels are for an organization. Risk scores can be calculated and displayed in a customizable format and with a frequency that meets a specific client's needs.

In step 602, process 600 can implement a sign-up process for a customer entity. When the customer signs up, process 600 can obtain various basic information about the industry that the customer entity operates in. Process 600 can also obtain, inter alia, revenue, employee population size details, regulations that are applicable, the operational IT systems and the like. Based on the data collected from other customers in the same industry and customer size, the risk score is arrived upon based on Machine Learning algorithms that calculate a baseline for the industry (e.g. industry benchmarking).

In step 604, process 600 can implement a pre-assessment process(es). Based on the needs of the industry and/or for the entity (e.g. a company, educational institution, etc.), the customer selects controls that are to be assessed. Based on the customer's selection, process 500 can calculate a risk score. The risk score is based on, inter alia, a set of groupings of the risks which may have impact on the customer's security and data privacy profile. The collective impacts and likelihoods of the parts of the compliance assessments that are not selected can determine an upper level of the risk score. This can be based on pre-learned machine learning algorithms.

In step 606, process 600 can implement an after-assessment process(es). The after-assessment process(es) can relate to the impact of grouping of risks that create an exponential impact. The after-assessment process(es) can be based on the status of the assessment the risk score. The after-assessment process(es) can be determined based on machine-learning algorithms that have been trained on data that exists on similar customer assessments.

Returning to process 500, in step 504, process 500 can implement a calculation of risk exposure assessment. It is noted that customers may wish to perform a cost-benefit analysis to assist with the decision to mitigate the risk using established processes. A dollar valuation of risk exposure provides a level of objectivity and justification for the expenses that the organization has to incur in order to mitigate the risk. Process 500 can use machine learning and existing heuristic data from organizations of similar size, industry and function and then extrapolate the data to determine the risk exposure, based on industry benchmarking, for the customer.

In step 506, process 500 can detect anomalies in risk scores. The risk scores are calculated according to the assessment-results for a given period. Process 500 can then make comparisons with the same week of a previous month and/or same month/quarter of a previous year. While doing the comparisons, the seasonality of risk can be considered along with its patterns as the risk may be just following a pattern even if it has varied widely from the last period of assessment. A machine learning algorithm (e.g. a Recurrent Neural Network (RNN), etc.) can be trained to detect these patterns and predict the approximate risk score that the user is expected to obtain during the upcoming assessments, according to the existing patterns in the data. The RNN can be trained on different types of patterns like, for example, sawtooth, impulse, trapezoid wave form and step sawtooth. Visualizations can display predicted versus actual scores and alert the users of anomalies.

In step 508, process 500 can implement risk scenario testing. In one example, risks that are being assessed may have some dependencies and triggers that may cause exponential exposures. It is noted that dependencies can exist between the risks once discovered. Accordingly, weights can be assigned to exposures based on the type of dependency. Exposures can be much higher based on additive, hierarchical or transitive dependencies. Process 500 calculates the highest possible risk exposures with all the risk scenarios and attracts the users' attention where the most attention is needed. Process 500 can automatically identify non-compliance in respect of certain controls and generates a list of possible scenarios based on the risk dependencies, then bubble up the most likely scenarios for the user to review.

Returning to process 400 in step 404, process 400 can implement data collection, reporting and communication. Process 400 can obtain data that is used for assessment that is generated by the customer's computing network/system as an output. These features help the user to optimize data collection with the lowest possibility of errors on the input side, and on the output side provide the best possible reporting and communication capability. Process 400 can use process 700 to implement step 404.

Figure 7:
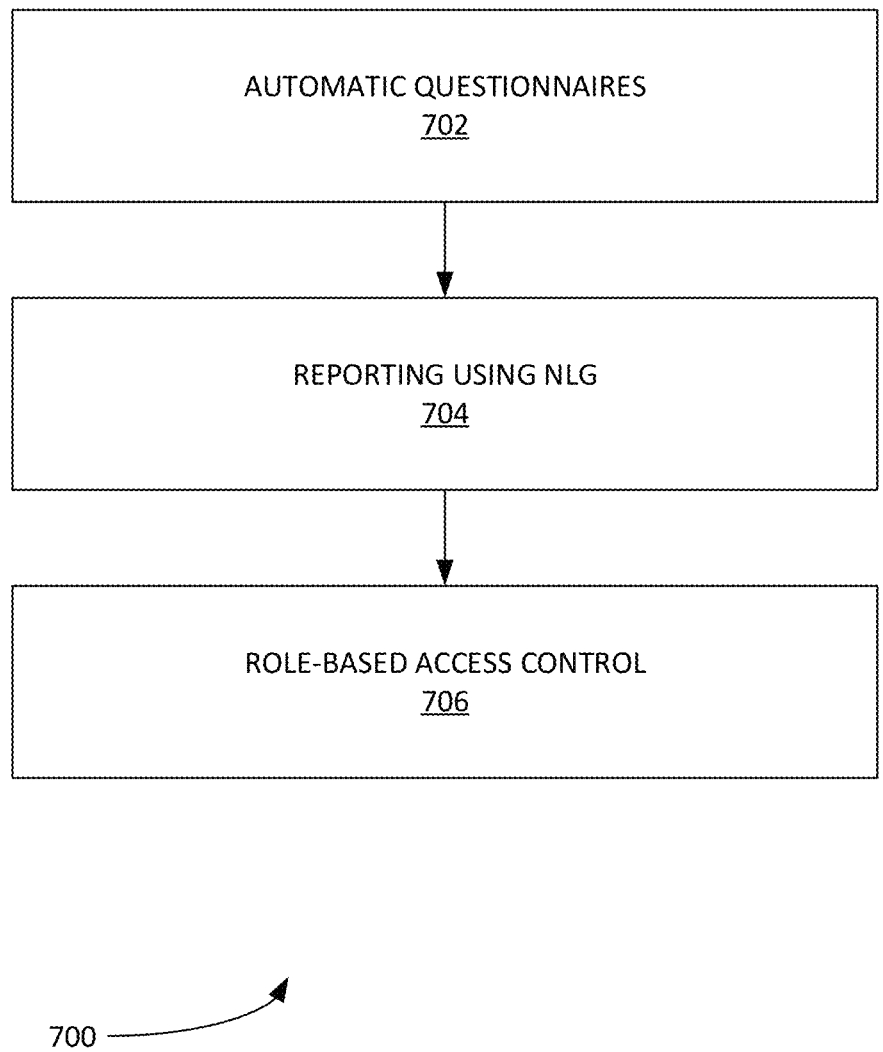
FIG. 7 illustrates an example data collection, reporting and communication process, according to some embodiments.

FIG. 7 illustrates an example data collection, reporting and communication process 700, according to some embodiments. In step 702, process 700 can create and implement automatic questionnaires. With the use of automatic questionnaires, any data in the customer system that is missing can be detected and flagged and, using NLG techniques, questions can be generated and sent in the form of a questionnaire that has to be filled in by the user/customer (e.g. a system administrator) to obtain the missing data required for risk scoring.

Figure 8:
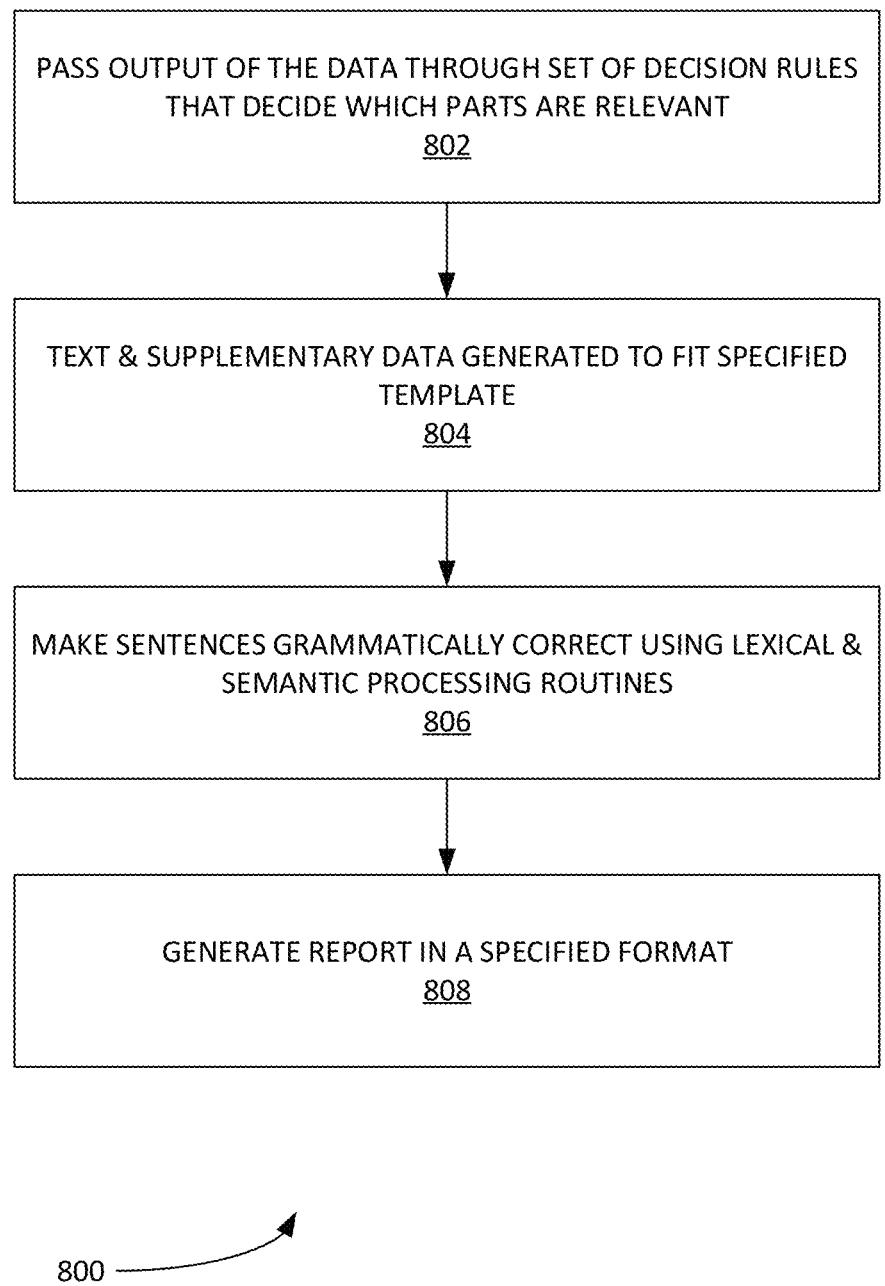
FIG. 8 illustrates an example process for generating a report using NLG, according to some embodiments.

In step 704, process 700 can generate a report using NLG. It is noted that users may wish to obtain a snapshot of the data in a report format that can be used for communication in the organization at various levels. These reports can be automatically generated using a predetermined template for the report which is relevant to the client's industry. The report can be generated by process 800. FIG. 8 illustrates an example process 800 for generating a report using NLG, according to some embodiments.

In step 802, process 800 can use the output of the data. Process 800 can pass it through a set of decision rules that decide what parts of the report are relevant. In step 804, the text and supplementary data can be generated to fit a specified template. In step 806, process 800 can make the sentences grammatically correct using lexical and semantic processing routines. In step 808, the report can then be generated in any format (e.g. PDF, HTML, PowerPoint, etc.) as required by the user. The templates can be used to generate various dashboard views, such as those provided infra.

Figure 9:
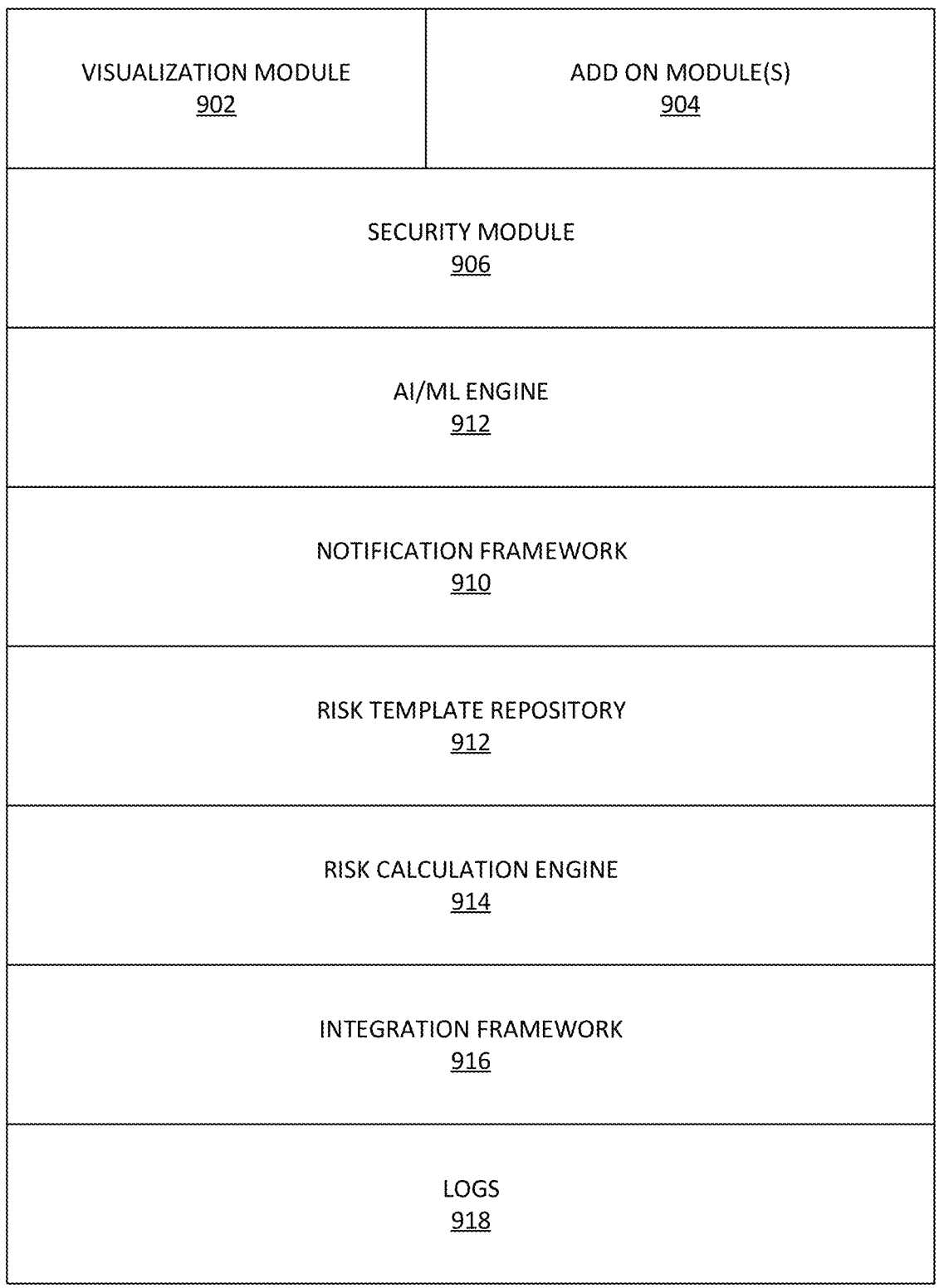
FIG. 9 illustrates a Risk Identification, Quantification, Benchmarking and Mitigation Engine Delivery platform with modularized-core capabilities and components, according to some embodiments

FIG. 9 illustrates additional information for implementing a Risk Identification, Quantification, Benchmarking and Mitigation Engine Delivery platform, according to some embodiments. As shown, a Risk Identification, Quantification, Benchmarking and Mitigation Engine Delivery platform 200 can modularized with core capabilities and foundational components. These capabilities are available for all customers and initial license includes, inter alia: security, visualization, notification framework, AI/ML analytics-based predictive models, risk score calculation module, risk templates integration framework, etc. Risk Identification, Quantification, Benchmarking and Mitigation Engine Delivery platform 200 can add various customizable risk models by category and/or industry that are relevant to the organization. These additional risk models can be added to the—core Risk Identification, Quantification, Benchmarking and Mitigation Engine Delivery platform 200 and/or can be licensed individually. These additional modules can be customized to a customer's requirements and needs.

As shown in the screen shots, Risk Identification, Quantification, Benchmarking and Mitigation Engine Delivery platform 200 provides a visual dashboard that highlights organizational risk based on defined risk models, for example Compliance, System, Security and Privacy. The dashboard allows users to aggregate and highlight risk as a risk score which can be drilled down for each of the models and then view risk at model level. As shown, users can also drill down into the model to view risk at a more granular detail.

Generally, in some example embodiments, Risk Identification, Quantification, Benchmarking and Mitigation Engine Delivery platform 200 can provide out of box connectivity with various products (e.g. Salesforce, Workday, ServiceNow, Splunk, AWS, Azure, GCP cloud providers, etc.), as well as ability to connect with any database or product with minor customization. Risk Identification, Quantification, Benchmarking and Mitigation Engine Delivery platform 200 can consume the output of data profiling products or can leverage DLP for data profiling. Risk Identification, Quantification, Benchmarking and Mitigation Engine Delivery platform 200 has a customizable notification framework which can proactively monitor the integrating systems to identify anomalies and alert the organization. Risk Identification, Quantification, Benchmarking and Mitigation Engine Delivery platform 200 can track the lifecycle of the risk for last twelve (12) months. Risk Identification, Quantification, Benchmarking and Mitigation Engine Delivery platform 200 has AI/ML capabilities (e.g. see AI/ML engine 908 infra) to predict and highlight risk as a four-dimensional model based on twelve-month aggregate. The dimensions can be measured by color, size of bubble (e.g. importance and impact to organization/enterprises), cost to fix and risk definition. Risk Identification, Quantification, Benchmarking and Mitigation Engine Delivery platform 200 includes an alerting and notification framework that can customize messages and recipients.

Risk Identification, Quantification, Benchmarking and Mitigation Engine Delivery platform 200 can include various addons as noted supra. These addons (e.g. inventory trackers for retailers, controlled substance tracker for healthcare organizations, PII tracker, CCPA tracker, GDPR tracker) can integrate with common framework and are managed through common interface.

Risk Identification, Quantification, Benchmarking and Mitigation Engine Delivery platform 200 can proactively monitor the organization at a user-defined frequency. Risk Identification, Quantification, Benchmarking and Mitigation Engine Delivery platform 200 has the ability to suppress risk based on user feedback. Risk Identification, Quantification, Benchmarking and Mitigation Engine Delivery platform 200 can integrate with inventory and order systems. Risk Identification, Quantification, Benchmarking and Mitigation Engine Delivery platform 200 contains system logs. Risk Identification, Quantification, Benchmarking and Mitigation Engine Delivery platform 200 can define rules by supported by Excel Templates. Risk Identification, Quantification, Benchmarking and Mitigation Engine Delivery platform 200 can include various risk models that are extendable and customizable by the organization.

More specifically, FIG. 9 illustrates a Risk Identification, Quantification, Benchmarking and Mitigation Engine Delivery platform 200 with modularized-core capabilities and components 900, according to some embodiments. Modularized-core capabilities and components 900 can be implemented in Risk Identification, Quantification, Benchmarking and Mitigation Engine Delivery platform 200. Modularized-core capabilities and components 900 can include a customizable compliance AI tool (e.g. AI/ML engine 208, etc.). Modularized-core capabilities and components 900 can include PCI DSS controls applicable for organizations. Modularized-core capabilities and components 900 can also include GDPR controls, HIPAA controls, ISMS (includes ISO27001) controls, SOC2 controls, NIST controls, CCPA controls, etc. The use of these controls can be based on the various relevant application for the customer(s). Modularized-core capabilities and components 900 can include a processing engine to obtain the status from organizations. Modularized-core capabilities and components 900 can provide a dashboard enabling to the compliance stakeholders to take action based on the risk score (e.g. see visualization module 902 infra). These controls can be based on the various relevant application for the customer(s). Modularized-core capabilities and components 900 can include a processing engine to obtain the status from organizations.

Modularized-core capabilities and components 900 can include a visualization module 902. Visualization module 902 can generate and manage the various dashboard view (e.g. such as those provided infra). Visualization module 902 can use data obtained from the various other modules of FIG. 9, as well as applicable systems in Risk Identification, Quantification, Benchmarking and Mitigation Engine Delivery platform 200. The dashboard can enable stakeholders to take action based on the risk score.

Add on module(s) 904 can include various modules (e.g. CCPA Module, PCI module, GDPR module, HIPPA module, retail inventory module, FCRA module, etc.).

Security module 906 provide an analysis of a customer's system and network security systems, weaknesses, potential weaknesses, etc.

AI/ML engine 908 can present a unique risk score for the controls based on the historical data. AI/ML engine 908 can provide AI/ML analytics based predictive models of Risk Identification, Quantification, Benchmarking and Mitigation Engine Delivery platform 200. For example, AI/ML 908 can present a unique risk score for the controls based on the historical data.

Notification Framework 910 generate notifications and other communications for the customer. Notification Framework 910 can create questionnaires automatically based on missing data. Notification Framework 910 can create risk reports automatically using Natural Language Generation. The output of Notification Framework 910 can be provided to visualization module 902 for inclusion in a dashboard view as well.

Risk Template Repository 912 can include function specific templates 202 and/or any other specified templates described herein.

Risk calculation engine 914 can take inputs from multiple disparate sources, intelligently analyze and present the organizational risk exposure from the sources as a numerical score using proprietary calculations (e.g. a hierarchy using pre-learned algorithms in a ML context, etc.). Risk calculation engine 914 can perform automatic risk scoring after customer sign-up. Risk calculation engine 914 can perform automatic risk scoring before and after an assessment as well. Risk calculation engine 914 can calculate the monetary valuation of a risk exposure after the assessment process. Risk calculation engine 914 can provide a default risk profile set-up for an organization based on their industry and stated risk tolerance. Risk calculation engine 914 can detect anomalies in risk scores for a particular period assessed. Risk calculation engine 914 can provide a list of risk scenarios which can have an exponential impact based.

Integration Framework 916 can provide and manage the integration of security and compliance with a customer's risk portfolio management (e.g. RPPBM).

Logs 918 can include various logs of relevant to customer system and network status, the operations of Risk Identification, Quantification, Benchmarking and Mitigation Engine Delivery platform 200 and/or any other relevant systems discussed herein.

Example User Interfaces/Dashboard Views

FIGS. 10-14 illustrates example user interfaces/dashboard views 1000-1400 provided by a Risk Identification, Quantification, Benchmarking and Mitigation Engine Delivery platform, according to some embodiments. As shown in user interfaces/dashboard views 1000-1400, the Risk Identification, Quantification, Benchmarking and Mitigation Engine Delivery platform 200 can provide real-time risk and compliance assessment through custom-built external connectors and unique calculations to convert multiple external parameters into a risk score number for the organization. The Risk Quantification and Mitigation Engine Delivery platform 200 can implement a risk score improvement over time through machine learning. The Risk Identification, Quantification, Benchmarking and Mitigation Engine Delivery platform 200 implements predictions of risk based on current and future events through link with change management systems. The Risk Identification, Quantification, Benchmarking and Mitigation Engine Delivery platform 200 can provide expected risk level using machine learning techniques to compare it with the actuals. The Risk Identification, Quantification, Benchmarking and Mitigation Engine Delivery platform 200 can provide auto-discovery of contributing factors and drilldowns. Interfaces/dashboard views 1000-1300 illustrate the current state of Risk Identification, Quantification, Benchmarking and Mitigation Engine Delivery platform and these may change as the product evolves and customized to an organization's risk management needs.

Figure 10:
FIGS. 10-14 illustrates example user interfaces/dashboard views provided by a Risk Identification, Quantification, Benchmarking and Mitigation Engine Delivery platform, according to some embodiments.
Figure 14:
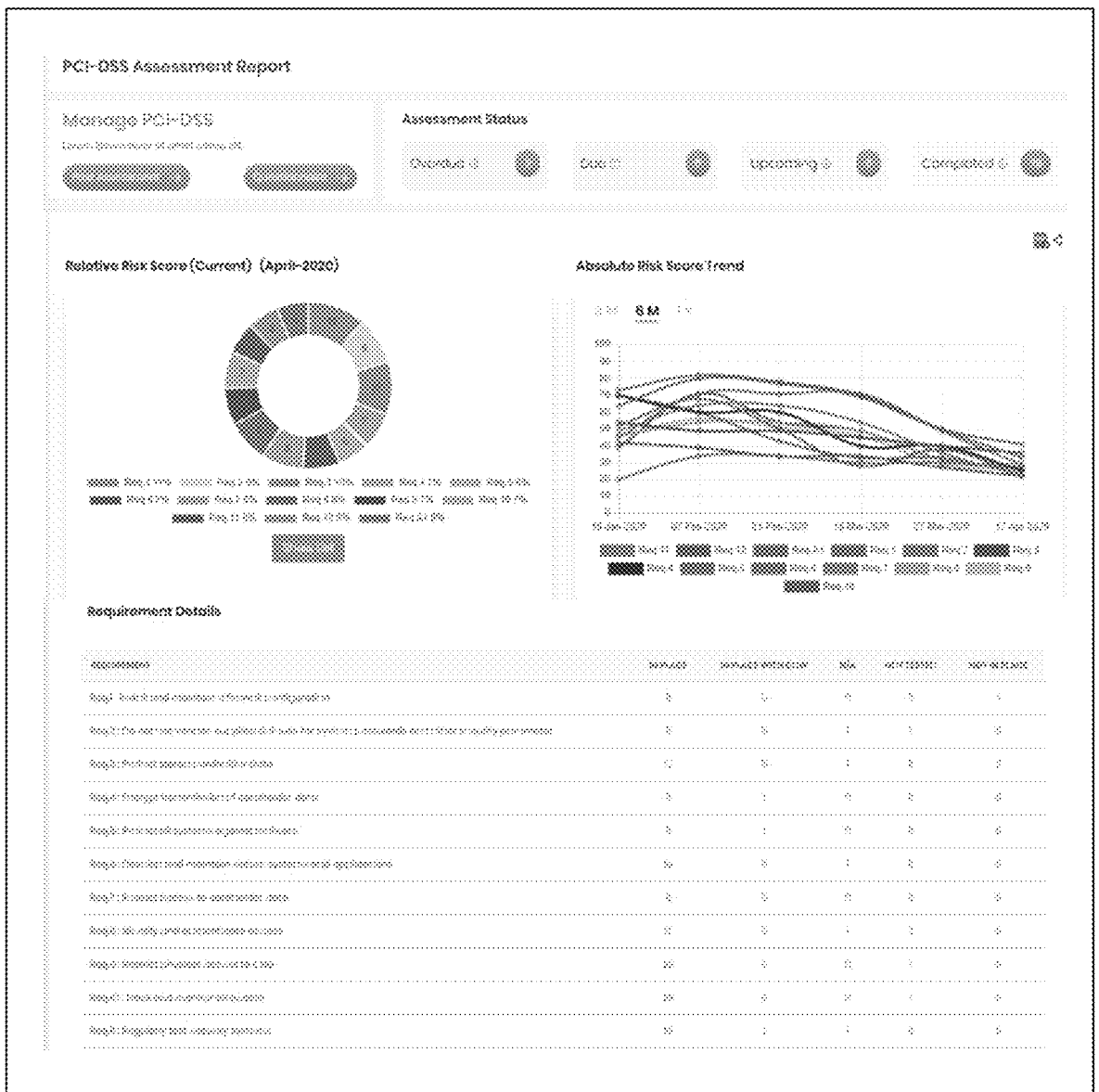

FIG. 10 illustrates an example dashboard view 1000 of a risk breakdown, according to some embodiments. Dashboard view 1000 illustrates a risk break-down based on various specified sources. These sources can be displayed in a list format with the percentage of each source as a part of the overall risk displayed. The sources and their percentage risk score can be also be displayed in a graphical format (e.g. pie chart, circle graph, bar graph, etc.). Hyper-links can be provided where the user can access the underlying data sources and/or other information regarding each respective risk source. FIG. 14 illustrates an example dashboard view 1400, according to some embodiments. Via dashboard view 1400, the user can access the underlying data sources and/or other information regarding each respective risk source. In this particular example, the customer is managing PCI-DSS risk. Dashboard view 1400 illustrates how the user is able to view the risk breakdown, risk trends as a function of time and then drill down into risk and/or various requirement details.

Figure 11:
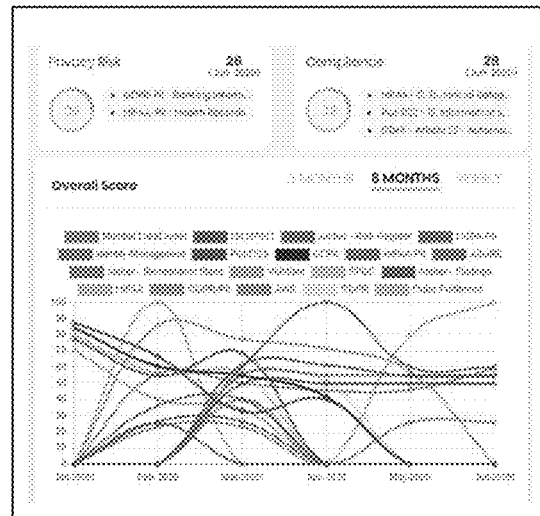

FIG. 11 illustrates an example dashboard view 1100 showing risk trends as a function of time, according to some embodiments. The values of the risk sources can be displayed in a time series format with the value of each risk source varying as a function of time. Hyper-links can be provided where the user can access the underlying data sources and/or other information regarding each respective risk source (e.g. see FIG. 14).

Figure 12:
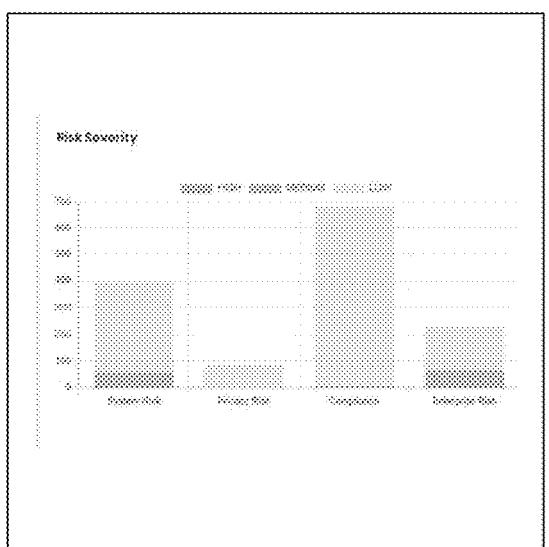

FIG. 12 illustrates an example bar graph 1200 providing levels of risk severity, according to some embodiments. Bar graph 1200 can show different risk models in each bar. Each risk model can be broken down, by number of underlying controls and categorized into high, medium and low risk.

Figure 13:
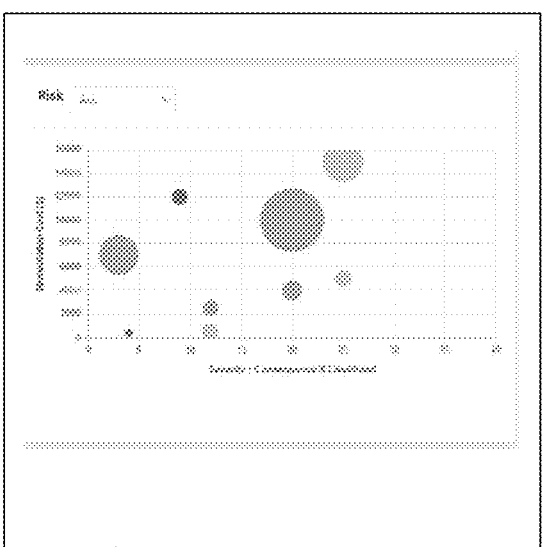

FIG. 13 illustrates an example bubble chart 1300, according to some embodiments. Bubble chart 1300 can displays four dimensions of the risk-score data. Each risk source can be displayed with its four points of associated data plotted as a disk that expresses two of the $v_i$ values through the disk's x-y location, the third through its size and the fourth through its potential financial risk exposure if the risk is not remediated. The x-axis can be the severity of the risk (e.g. in terms of consequences, etc.). The y-axis can be the cost of remediation (e.g. in terms of monetary cost) with respect to the risk source.

Additional Computing Systems

Figure 15:
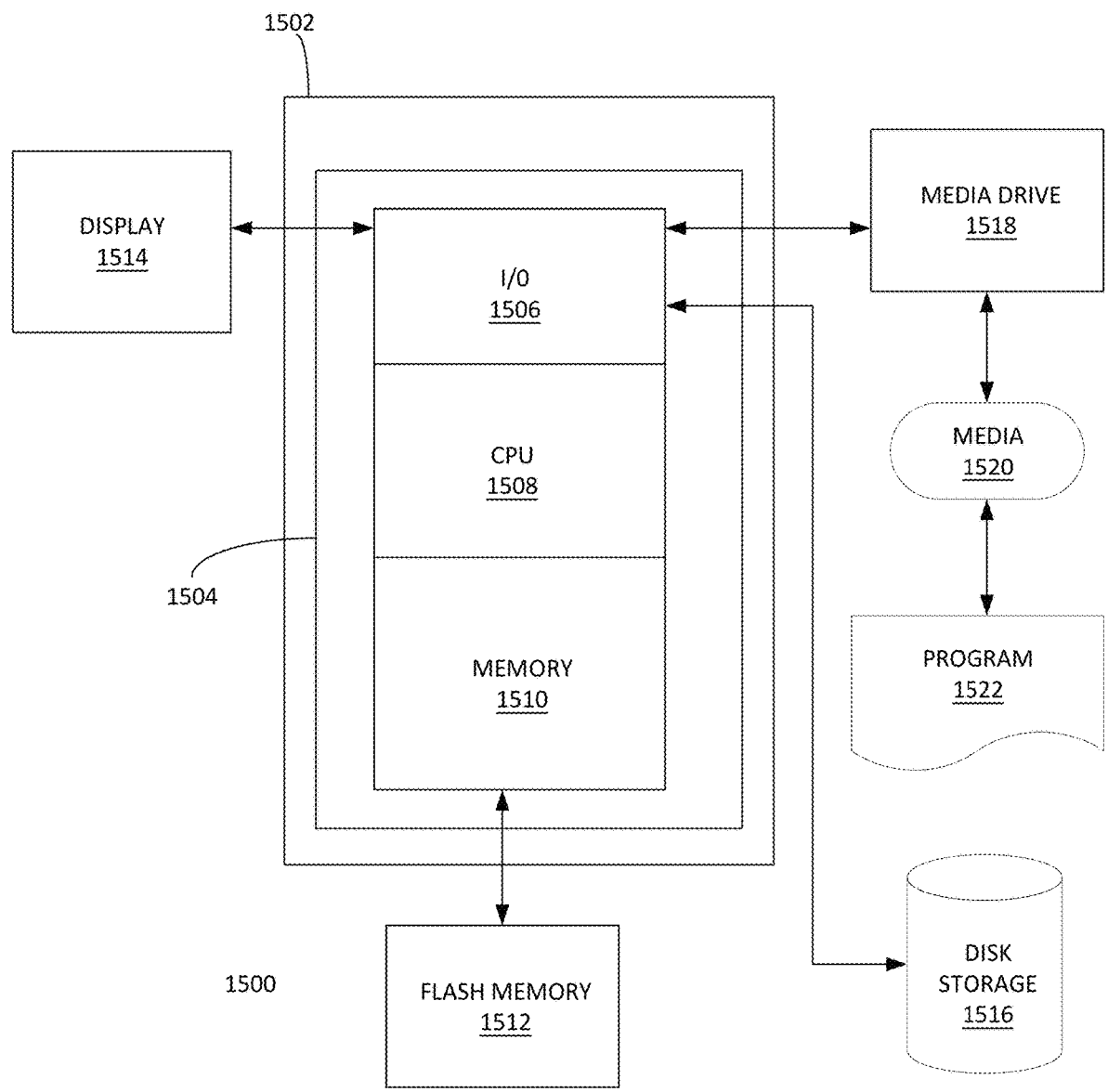
FIG. 15 depicts an example computing system that can be configured to perform any one of the processes provided herein.

FIG. 15 depicts an exemplary computing system 1500 that can be configured to perform any one of the processes provided herein. In this context, computing system 1500 may include, for example, a processor, memory, storage, and I/O devices (e.g., monitor, keyboard, disk drive, Internet connection, etc.). However, computing system 1500 may include circuitry or other specialized hardware for carrying out some or all aspects of the processes. In some operational settings, computing system 1500 may be configured as a system that includes one or more units, each of which is configured to carry out some aspects of the processes either in software, hardware, or some combination thereof.

FIG. 15 depicts computing system 1500 with a number of components that may be used to perform any of the processes described herein. The main system 1502 includes a motherboard 1504 having an I/O section 1506, one or more central processing units (CPU) 1508, and a memory section 1510, which may have a flash memory card 1512 related to it. The I/O section 1506 can be connected to a display 1514, a keyboard and/or another user input (not shown), a disk storage unit 1516, and a media drive unit 1518. The media drive unit 1518 can read/write a computer-readable medium 1520, which can contain programs 1522 and/or databases. Computing system 1500 can include a web browser. Moreover, it is noted that computing system 1500 can be configured to include additional systems in order to fulfill various functionalities. Computing system 1500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Embodiments

Figure 16:
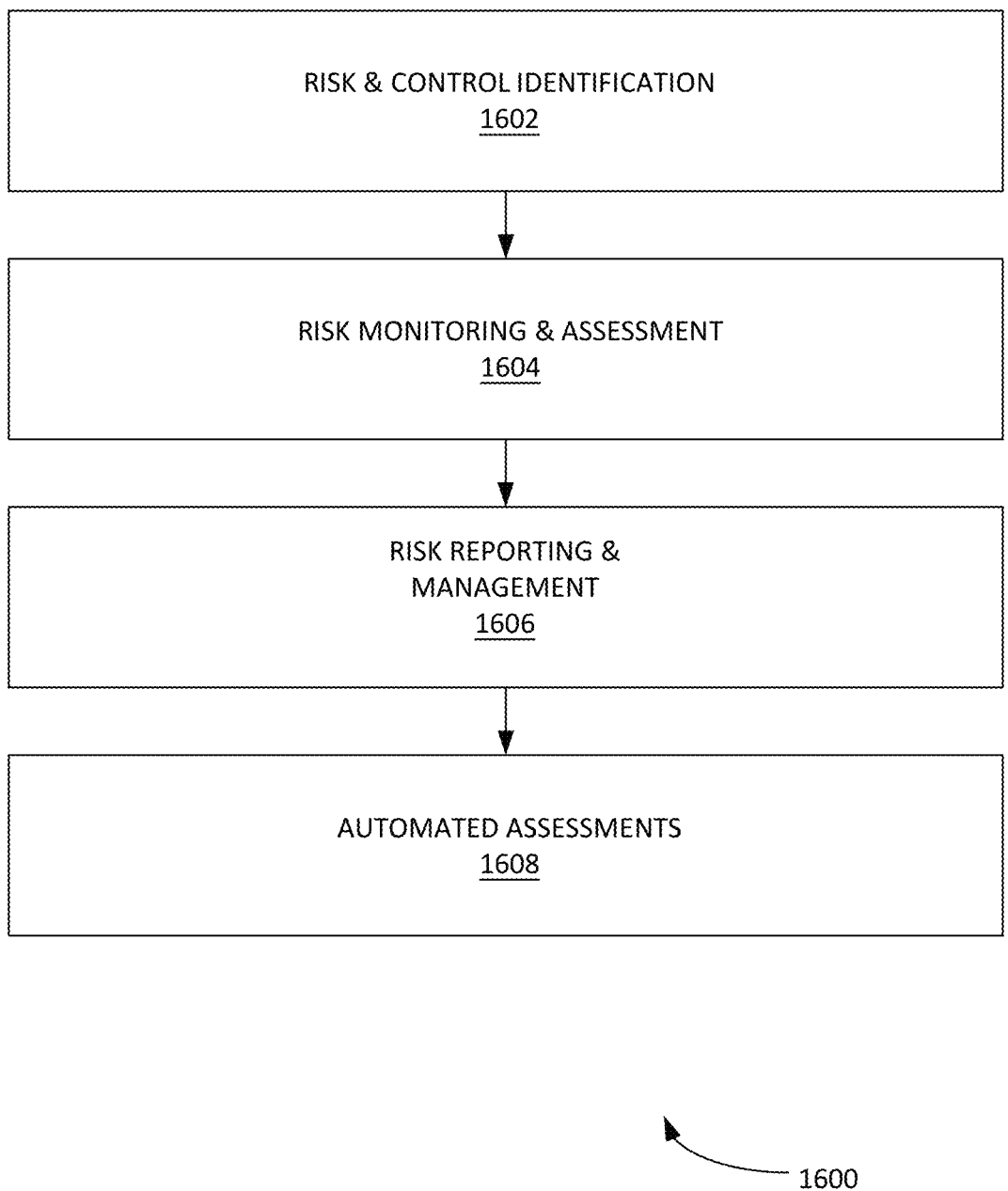
FIG. 16 illustrates an example process for enterprise risk analysis, according to some embodiments.

FIG. 16 illustrates an example process 1600 for enterprise risk analysis, according to some embodiments. In step 1602, process 1600 can implement risk and control identification. Risks and controls can be categorized by, inter alia: risk type, function, location, segment, etc. Owners and stakeholders can be identified. This can include identifying relevant COSO standards. This can include identifying and quantifying, inter alia: impact, likelihood of exposure in terms of cost, remediation cost, etc.

In step 1604, process 1600 can implement risk monitoring and assessment. Process 1600 can provide and implement various automated/manual standardized templates and/or questionnaires. Process 1600 can implement anytime on-demand alerts for pending/overdue assessments as well.

In step 1606, process 1600 can implement risk reporting and management. For example, process 1600 can provide a risk scoring risk analytics dashboard, customizable widgets, alerts and notifications. These can include various AI/ML capabilities.

In step 1608, process 1600 can generate automated assessments (e.g. of system/cybersecurity risk, AWS®, GCP®, VMWARE®, AZURE®, SFDC®, SERVICE NOW®, SPLUNK® etc.). This can also include various privacy assessments (e.g. GDPR-PII, CCPA-PII, PCI-DSS-PII, ISO27001-PII, HIPAA-PII, etc.). Operational risk assessments can be implemented as well (e.g. ARCHER®, ServiceNow®, etc.). Process 1600 can review COMPLIANCE (E.g. GDPR, CCPA, PCI-DSS, ISO27001, HIPAA, etc.). Manual assessments can also be used to validate/supplement automated assessments.

Figure 17:
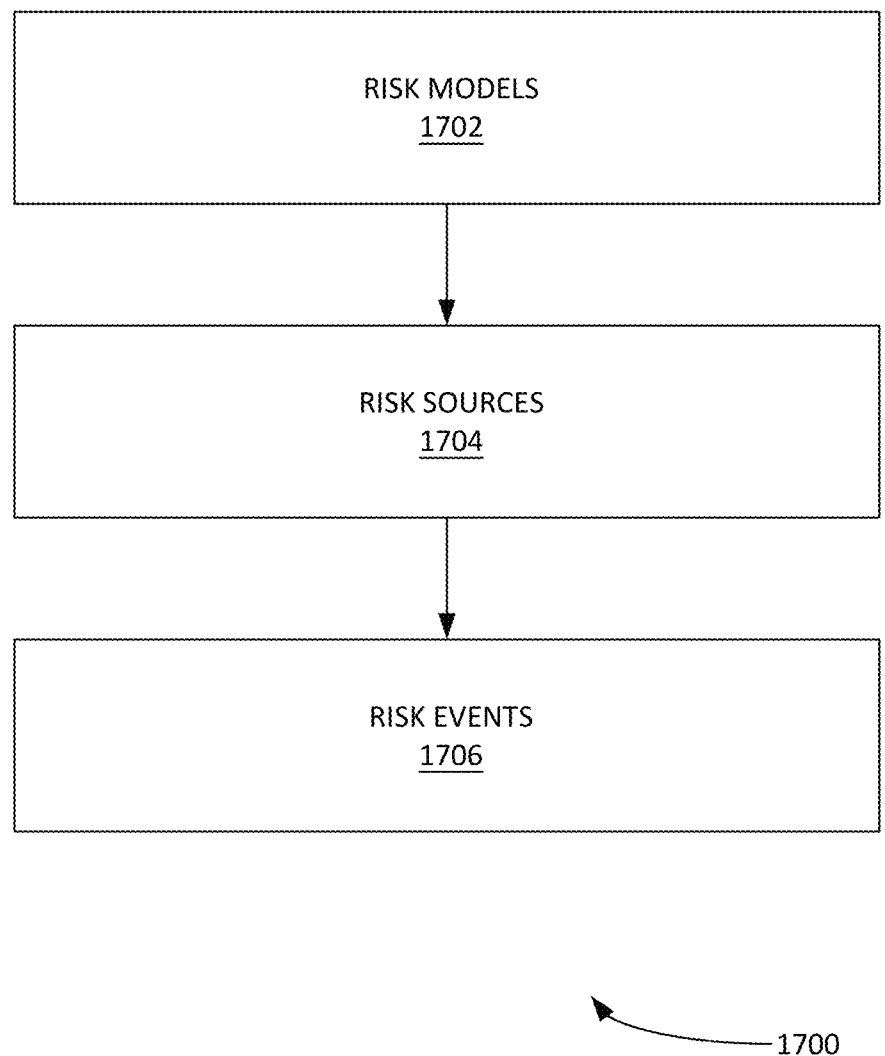
FIG. 17 illustrates an example process for implementing a risk architecture, according to some embodiments.

FIG. 17 illustrates an example process 1700 for implementing a risk architecture, according to some embodiments. In step 1702, process 1700 can generate risk models. This can provide a quantitative view of an organization's enterprise level risk categorization.

In step 1704, process 1700 provide a list of risk sources. These can be any items exposing an enterprise to risk. In step 1706, process 1700 can provide risk events. This can include monitoring and identification of risk.

Figure 18:
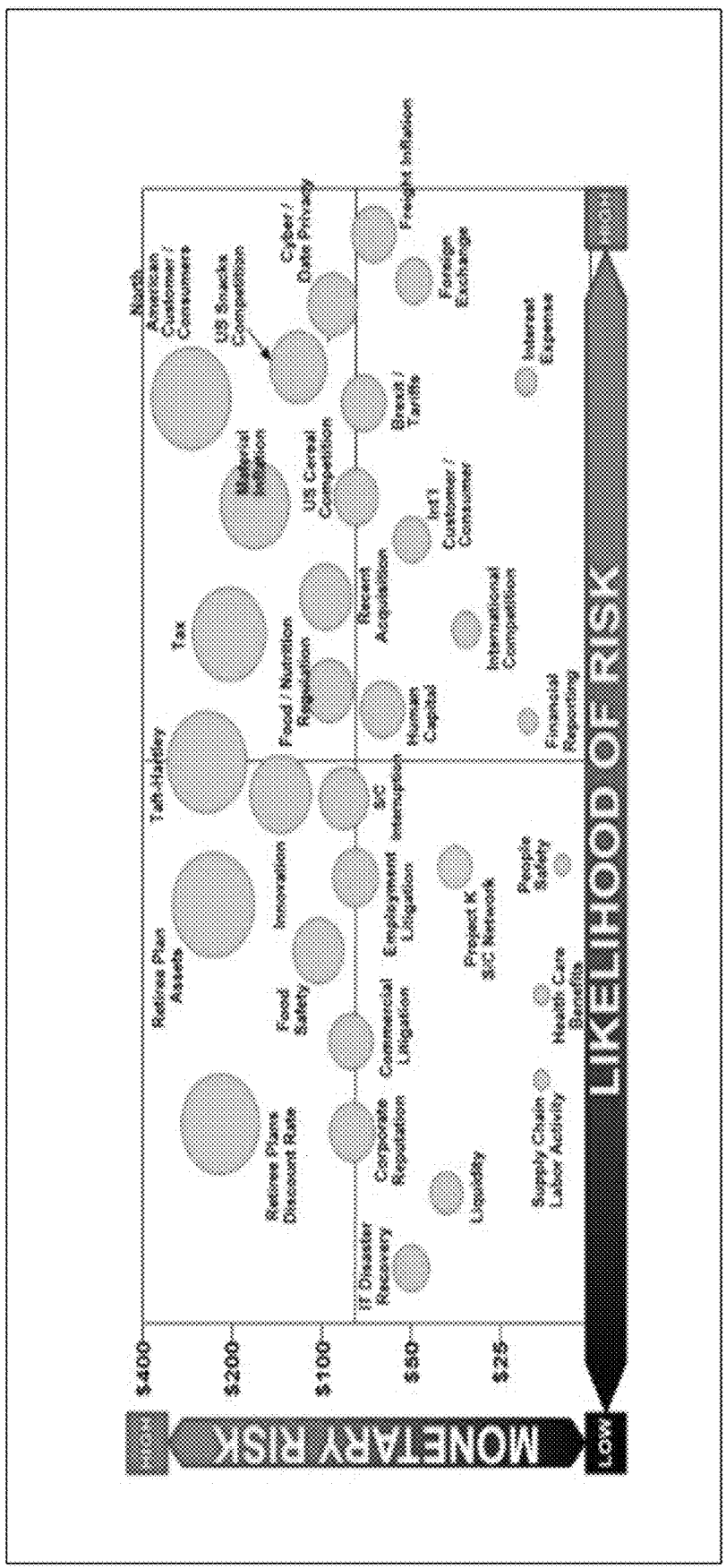
FIG. 18 illustrates an example risk report graphic, according to some embodiments.

FIG. 18 illustrates an example risk report graphic 1800, according to some embodiments. Risk report graphic 1800 can show a graph of likelihood of risk plotted against a monetary cost of risk. Various risk variables can be analyzed and plotted. Additional plot attributes can include, inter alia: risk model and risk source selection and set up; risk weightings set-up and risk aggregation; connectivity (e.g. risk source to risk model) controls; mapping risk; event identification and mapping to risk source; etc. These can be provided as additional axis/dimensions as well.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes and methods disclosed herein can be embodied in a machine-readable medium and/or a machine accessible medium compatible with a data processing system (e.g., a computer system) and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized process useful for automating Risk Identification, Quantification, Benchmarking and Mitigation in an enterprise computer system, comprising:

integrating an enterprise security, privacy and compliance system in an enterprise computer system, wherein the enterprise security, privacy and compliance system monitors a set of risk sources in the enterprise computer system by integrating an enterprise security, privacy and compliance system with a set of Risk Program, and Portfolio Management (RPPBM) practices in an enterprise computer system, wherein the enterprise security, privacy and compliance system monitors a set of risk sources in the RPPBM practices;

implementing an identification and a weighted scoring of a set of risks associated with each risk source;

with a specified machine learning technique, automatically matching a set of similar risk inputs with an associated weight, wherein the set of similar risk inputs are similar to the risk sources, wherein the specified machine learning technique comprises a Recurrent neural network (RNN);

monitoring the relevant enterprise systems for changes in risk levels of each risk source;

generating a risk value number for each risk source, wherein the risk value number is used to avoid a subjective understanding of the risk source;

with a natural language generation (NLG) functionality, generating a report comprising a snapshot of the data of the risk value number for each risk source;

generating an effect on the computer system of a remediative action of a specified risk source;

graphically displaying the preview of the effect of system changes from a set of remediative actions for the set of risk sources in a bubble plot graph with the cost of each of the set of remediative action on a y-axis and a severity of the risk of each risk source in terms of a its risk value on an x-axis;

generating and serving a dashboard view of the set of risk-value numbers for each risk source, wherein the set of risk-value numbers are displaying in a graph; and training another RNN model to make comparisons with a risk value of a same time period of a previous year in the enterprise computer system, wherein the other RNN model uses the comparisons to detect a risk pattern in an existing pattern in the data of a risk value of the enterprise computer system and detect an anomalies in the risk value number.

2. The computerized process of claim 1 further comprising:

providing a preview of the effect of system changes from the remediative action using a predictive analytic method.

3. The computerized process of claim 1, wherein the enterprise security, privacy and compliance system monitors a set of risk sources in the RPPBM practices.

4. The computerized process of claim 3, wherein the graph comprises a circle graph with list of each risk source and a percentage of each risk source as a portion of overall risk.

5. The computerized process of claim 4, wherein each element of the list of each risk source comprises a hyperlink to a set of underlying data sources used to build the risk value of each respective risk source.

6. A computerized system, comprising:

at least one processor configured to execute instructions;

a memory containing instructions when executed on the processor, causes the at least one processor to perform operations that:

integrate an enterprise security and compliance system with a set of Risk Program, and Portfolio Management (RPPBM) practices, wherein the enterprise security and compliance system monitors a set of risk sources in the practice;

implement an identification and a weighted scoring of a set of risks associated with each risk source;

with a specified machine learning technique, automatically match a set of similar risk inputs with an associated weight, wherein the set of similar risk inputs are similar to the risk sources in the RPPBM practices;

monitor the relevant enterprise systems for changes in risk levels of each risk source;

generate a risk value number for each risk source, wherein the risk value number is used to avoid a subjective understanding of the risk source;

generate an effect on the computer system of a remediative action of a specified risk source;

graphically display the preview of the effect of system changes from a set of remediative actions for the set of risk sources in a bubble plot graph with the cost of each of the set of remediative action on a y-axis and a severity of the risk of each risk source in terms of a its risk value on an x-axis;

generate and serve a dashboard view of the set of risk-value numbers for each risk source, wherein the set of risk value numbers are displaying in a graph; and training another RNN model to make comparisons with a risk value of a same time period of a previous year in the enterprise computer system, wherein the other RNN model uses the comparisons to detect a risk pattern in an existing pattern in the data of a risk value of the enterprise computer system and detect an anomalies in the risk value number.

7. The computerized system of claim 6, wherein the memory containing instructions when executed on the processor, causes the at least one processor to perform operations that:

provide a preview of the effect of system changes from the remediative action using a predictive analytic method.

8. The computerized system of claim 6, wherein the memory containing instructions when executed on the processor, causes the at least one processor to perform operations that:

integrate an enterprise security and compliance system with a set of Risk, Program, and Portfolio Management practices in an enterprise computer system, wherein the enterprise security and compliance system monitors a set of risk sources in the RPPBM practices.

9. The computerized system of claim 8, wherein the enterprise security, privacy and compliance system monitors a set of risk sources in the RPPBM practices.

10. The computerized system of claim 6, wherein the memory containing instructions when executed on the processor, causes the at least one processor to perform operations that:

generate and serve a dashboard view of the set of risk value numbers for each risk source, wherein the set of risk value numbers are displaying in a graph.

11. The computerized system of claim 10, wherein the graph comprises a circle graph with list of each risk source and a percentage of each risk source as a portion of overall risk.

12. The computerized system of claim 11, wherein each element of the list of each risk source comprises a hyperlink to a set of underlying data sources used to build the risk value of each respective risk source.

* * * * *